(12) United States Patent
Kitano

(10) Patent No.: US 9,315,679 B2
(45) Date of Patent: Apr. 19, 2016

(54) TRANSPARENT CONDUCTIVE FILM AND METHOD FOR PRODUCING TRANSPARENT CONDUCTIVE FILM

(75) Inventor: Takahiro Kitano, Ibaraki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 850 days.

(21) Appl. No.: 12/597,802

(22) PCT Filed: Apr. 24, 2008

(86) PCT No.: PCT/JP2008/057924
§ 371 (c)(1),
(2), (4) Date: Mar. 5, 2010

(87) PCT Pub. No.: WO2008/139880
PCT Pub. Date: Nov. 20, 2008

(65) Prior Publication Data
US 2010/0215985 A1    Aug. 26, 2010

(30) Foreign Application Priority Data

Apr. 27, 2007 (JP) ................. 2007-118011

(51) Int. Cl.
| | |
|---|---|
| *B32B 9/00* | (2006.01) |
| *C09D 5/24* | (2006.01) |
| *C01B 31/02* | (2006.01) |
| *B05D 7/04* | (2006.01) |

(52) U.S. Cl.
CPC ................ *C09D 5/24* (2013.01); *C01B 31/022* (2013.01); *B05D 7/04* (2013.01); *B05D 2601/20* (2013.01); *C01B 2202/00* (2013.01); *Y10T 428/30* (2015.01)

(58) Field of Classification Search
CPC ................ C01B 2202/00; C01B 32/00; C01B 31/022–31/0293
USPC .................... 428/408; 423/447.1, 447.2, 448; 977/742; 165/185
See application file for complete search history.

(56) References Cited

U.S. PATENT DOCUMENTS

| | | |
|---|---|---|
| 2002/0197477 A1 | 12/2002 | Ata et al. |
| 2003/0122111 A1 | 7/2003 | Glatkowski |
| 2003/0207573 A1 | 11/2003 | Ramm et al. |
| 2004/0219093 A1* | 11/2004 | Kim et al. .................. 423/447.2 |
| 2005/0062927 A1 | 3/2005 | Nakamura et al. |
| 2005/0269707 A1 | 12/2005 | Nashiki et al. |
| 2009/0032777 A1 | 2/2009 | Kitano et al. |
| 2009/0302029 A1* | 12/2009 | Krishna et al. ................. 219/678 |

FOREIGN PATENT DOCUMENTS

| | | |
|---|---|---|
| CN | 1543399 A | 11/2004 |
| CN | 1707700 A | 12/2005 |
| JP | 2001 199715 | 7/2001 |
| JP | 2002 335004 | 11/2002 |
| JP | 2003 218361 | 7/2003 |
| JP | 2004 202948 | 7/2004 |

(Continued)

OTHER PUBLICATIONS

U.S. Appl. No. 12/597,844, filed Oct. 27, 2009, Kitano.

(Continued)

*Primary Examiner* — Daniel H Miller
(74) *Attorney, Agent, or Firm* — Oblon, McClelland, Maier & Neustadt, L.L.P.

(57) ABSTRACT

Disclosed is a transparent conductive film containing a single-walled carbon nanotube and a fullerene.

12 Claims, 1 Drawing Sheet

```
┌─────────────────────────────────────────────┐
│ LAYER CONTAINING SINGLE-WALLED CARBON       │
│ NANOTUBE AND FULLERENE                       │
├─────────────────────────────────────────────┤
│                                              │
│            SUBSTRATE MEMBER                  │
│                                              │
└─────────────────────────────────────────────┘
```

(56) References Cited

FOREIGN PATENT DOCUMENTS

| | | |
|---|---|---|
| JP | 2005 142088 | 6/2005 |
| JP | 2005 146259 | 6/2005 |
| JP | 2005-255985 | 9/2005 |
| JP | 2005 255985 | 9/2005 |
| JP | 2006 19239 | 1/2006 |
| JP | 2006-253024 | 9/2006 |
| JP | 2007 59360 | 3/2007 |
| JP | 2007 94442 | 4/2007 |
| WO | WO 02/076724 A1 | 10/2002 |
| WO | 2005/110594 A1 | 11/2005 |

OTHER PUBLICATIONS

U.S. Appl. No. 12/447,377, filed Apr. 27, 2009, Kitano, et al.

M. Kaempgen, et al., "Transparent carbon nanotube coatings", Applied Surface Science, Jan. 5, 2005, pp. 425-429.

Office Action issued Dec. 2, 2010 in China Application No. 200880013795.2.

U.S. Appl. No. 13/938,850, filed Jul. 10, 2013, Kitano, et al.

Office Action issued Mar. 21, 2013 in JP Patent Application No. 2009-514079.

* cited by examiner

TRANSPARENT CONDUCTIVE FILM AND METHOD FOR PRODUCING TRANSPARENT CONDUCTIVE FILM

APPLICABLE FIELD IN THE INDUSTRY

The present invention relates to a transparent conductive film.

BACKGROUND ART

Recently, an enlargement of a market of flat-screen devices typified by a liquid display augments a demand for the transparent conductive film. Additionally, the transparent conductive film is employed for an electrode. Further, it is employed for a member constituting a resistive touch panel. Further, it is employed for an electromagnetic wave shielding film. It is employed for various fields besides them. The transparent conductive film of this type, as a rule, is made of metal oxide such as Indium thin oxide (ITO). And, this transparent conductive film is produced with a dry plating method such as sputtering. Thus, the film-forming with these methods necessitates a high temperature. For this, the use of a resin substrate having a poor heat-resistance is greatly restricted. In addition, the film-forming requires a vacuum environment. For this, a gigantic film-forming device is necessitated as the substrate become big. Thus, the film-forming becomes costly. Further, In etc. is hard to obtain because it is rare. For this, it is costly.

The alternative technology, which replaces ITO, has been proposed from such a background. In particular, a wet coating, i.e. a coating technology has been proposed. Among them, attention to a coated film of a carbon nanotube is paid (Non-patent document 1).

However, a big point at issue that when the transparent conductive film employing the carbon nanotube is left as it is for a long time at a high temperature, conductivity thereof declines has been recognized.

As method for solving this point at issue, that is, a method for improving high-temperature durability, the method has been proposed of forming a protective layer upon the conductive film that is comprised of the carbon nanotube (Patent documents 1 and 2).

For example, in the Patent document 1, it has been proposed to form the protective layer such as polycarbonate, polyamide, polyethylene terephthalate, and acrylic resin.

For example, in the Patent document 2, it has been proposed to form the protective layer of the member selected from a group consisting of polyethylene, polypropylene, polyvinyl chloride, styrene resin, polyurethane, polyimide, polycarbonate, polyethylene terephthalate, cellulose, gelatin, chitin, polypeptide, polysaccharides, polynucleotide, and a mixture thereof.
Patent document 1: JP-2004-202948A
Patent document 2: JP-2005-255985A
Non-patent document 1: Applied Surface Science 252 (2005) 425-429

DISCLOSURE OF THE INVENTION

Problems to be Solved by the Invention

However, it has become clear that the transparent conductive film produced with the prior art is not sufficient in the high-temperature durability.

Thus, a task that the present invention is to solve, that is, an object of the present invention is to provide the transparent conductive film, which is excellent in the high-temperature durability, namely, does not lose high conductivity/transparency notwithstanding being left at a high temperature, at a low cost.

Means for Solving the Problem

The foregoing problems are solved by a transparent conductive film that is characterized in containing a single-walled carbon nanotube and a fullerene.

For example, the foregoing problems are solved by the transparent conductive film that is characterized in containing the single-walled carbon nanotube and the fullerene in an identical layer.

Or, the foregoing problems are solved by the transparent conductive film that is characterized in that a layer containing the single-walled carbon nanotube and a layer containing the fullerene are separately formed.

For example, the foregoing problems are solved by the transparent conductive film that is characterized in that the layer containing the fullerene is formed upon the layer containing the single-walled carbon nanotube.

Further, the foregoing problems are solved by the above-mentioned transparent conductive film that is characterized in having a content of 10 to 1000 mass parts of the fullerene per 100 mass parts of the single-walled carbon nanotube.

Further, the foregoing problems are solved by the above-mentioned transparent conductive film that is characterized in that the fullerene has a polar group.

Further, the foregoing problems are solved by the above-mentioned transparent conductive film that is characterized in that the fullerene has an OH group.

Further, the foregoing problems are solved by the above-mentioned transparent conductive film that is characterized in that a hard coat layer is formed between the substrate member and the layer containing the single-walled carbon nanotube.

Further, the foregoing problems are solved by the above-mentioned transparent conductive film that is characterized in that, when a surface resistivity after having kept the transparent conductive film at 80° C. for 14 days is defined as R1 ($\Omega/\square$), and a surface resistivity before keeping the transparent conductive film at 80° C. for 14 days as R0 ($\Omega/\square$), an increase ratio [(R1−R0)/R0×100] of a surface resistivity is 30 or less.

Further, the foregoing problems are solved by a transparent conductive film that is characterized in that, when a surface resistivity after having kept the transparent conductive film at 80° C. for 14 days is defined as R1 ($\Omega/\square$), and a surface resistivity before keeping the transparent conductive film at 80° C. for 14 days as R0 ($\Omega/\square$), an increase ratio [(R1−R0)/R0×100] of a surface resistivity is 30 or less.

Further, the foregoing problems are solved by a method of producing a transparent conductive film that is characterized in including a step of coating with a paint containing a single-walled carbon nanotube and a fullerene.

Further, the foregoing problems are solved by a method of producing a transparent conductive film that is characterized in including: a single-walled-carbon-nanotube containing paint coating step of coating with a paint containing a single-walled carbon nanotube; and a fullerene containing paint coating step of coating with a paint containing a fullerene.

An Advantageous Effect of the Invention

Even though the transparent conductive film in accordance with the present invention is left as it is at a high temperature, the conductivity/transparency thereof hardly declines due to existence of the fullerene. That is, it is excellent in the high-temperature durability.

In addition, the transparent conductive film in accordance with the present invention is excellent in abrasion-resistance. That is, existence of the fullerene in or on the film of the single-walled carbon nanotube makes magnitude of roughness between the single-walled carbon nanotubes small. For this, even though no protective layer is formed, flatness is enhanced. And, it becomes excellent in the abrasion-resistance.

Further, the paint containing the single-walled carbon nanotubes and the fullerene is excellent in the dispersibility of the single-walled carbon nanotube due to existence of the fullerene. Thus, with the case of carrying out the coating with the single-walled carbon nanotubes of which the concentration is high to constitute the conductive film, its painting workability is good. For example, it is excellent in the dispersibility of the single-walled carbon nanotube even though water or alcohol is employed as a solvent. Further, it is very excellent in the dispersibility of the single-walled carbon nanotube notwithstanding a small quantity of the fullerene (dispersing agent). For this, the conductive film coated with this paint is excellent in the transparency and the conductivity.

BEST MODE FOR CARRYING OUT THE INVENTION

Figure 1:
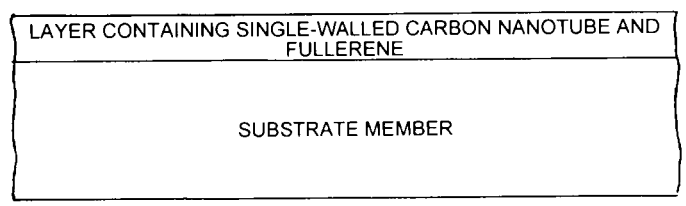
FIG. 1 is a schematic view of the transparent conductive film of the present invention.

The present invention relates to a transparent conductive film. This transparent conductive film has the single-walled carbon nanotube and the fullerene. As this aspect, there exist the case that the single-walled carbon nanotube and the fullerene are contained in an identical layer (see FIG. 1) and the case that the single-walled carbon nanotube and the fullerene are contained in a separate layer, respectively (see FIG. 2). When the single-walled carbon nanotube and the fullerene are contained in a separate layer, respectively, the layer containing the latter is formed upon the layer containing the former. The fullerene having a polar group (functional group) is preferable in the present invention. Among them, the fullerene having an OH group is preferable. Preferably, the quantity of the fullerene is 10 to 1000 mass parts per 100 mass parts of the single-walled carbon nanotube. Particularly, preferably, the quantity of the fullerene is 20 to 100 mass parts per 100 mass parts of the single-walled carbon nanotube. The reason is that too much fullerene could cause the transparency to decline. To the contrary, too little fullerene could cause the high-temperature durability to decline. The single-walled carbon nanotube is, particularly, a single-walled carbon nanotube subjected to a wet oxidation process. Among others, the single-walled carbon nanotube is a single-walled carbon nanotube subjected to a wet oxidation process of performing a reflux operation for 24 hours or more with nitric acid having a concentration of 50% or more, or a mixed acid of nitric acid and sulfuric acid. And, the single-walled carbon nanotube obtained with the arc-discharge method is preferably employed. Further, the single-walled carbon nanotube, which has a first absorption in a Raman scattering intensity in a range of which a Raman shift is $1340\pm40$ cm$^{-1}$, and a second absorption in a Raman scattering intensity in a range of which a Raman shift is $1590\pm20$ cm$^{-1}$, and yet satisfies a condition of 0<(the foregoing intensity of the first absorption)/(the foregoing intensity of the second absorption)≤0.03) in terms of a Raman spectrum characteristic that is detected with the 532 nm laser excitation, is preferably employed. Further, the single-walled carbon nanotube existing in a situation of being bundled, in which the number of the bundles of which a length exceeds 1.5 μm is more than that of the bundles of which a length is 1.5 μm or less, is preferable. Or, the single-walled carbon nanotube existing in a situation of being bundled, in which the length of the foregoing bundle is not single but has a predetermined distribution, and the foregoing predetermined distribution has a mode exceeding 1.5 μm in the frequency distribution of the bundle length for each 0.5 μm, is preferable. Among others, the single-walled carbon nanotube existing in a situation of being bundled, in which the length of the foregoing bundle is not single but has a predetermined distribution, the foregoing predetermined distribution has a mode exceeding 1.5 μm in the frequency distribution of the bundle length for each 0.5 μm, and yet the number of the bundles of which a length exceeds 1.5 μm is more than that of the bundles of which a length is 1.5 μm or less, is preferable.

With the case that the single-walled carbon nanotube and the fullerene are contained in an identical layer (conductive film) (see FIG. 1), this conductive film is produced by the coating with the paint containing the single-walled carbon nanotube, the fullerene, and the solvent (the single-walled carbon nanotube dispersion liquid). A ratio of the single-walled carbon nanotube versus the fullerene is, particularly, 10 to 1000 mass parts of the latter per 100 mass parts of the former from a viewpoint of a diapersion performance. And, a concentration of the fullerene is, particularly, 1 to 100000 ppm (preferably, it is 10 ppm or more, and yet, 100 ppm or more. It is 10000 ppm or less, and yet, 5000 ppm or less). Various liquids are employed for the single-walled carbon nanotube dispersion liquid of the present invention as a solvent. However, water, alcohol (particularly, aliphatic alcohol of which a carbon number is 7 or less), or a mixed liquid thereof is preferable. Particularly, the solvent containing at least water is preferable. And, the solvent of which pH exceeds 7 is preferable. That is, the alkaline solvent is preferable. The single-walled carbon nanotube dispersion liquid is produced as follows. That is, the single-walled carbon nanotube, the fullerene, and the solvent are firstly mixed. This mixing may be carried out not only simultaneously but also sequentially. Next, the mixed liquid is irradiated with ultrasonic waves, thereby allowing the single-walled carbon nanotube to be dispersed. Further, preferably, the method of producing the single-walled carbon nanotube dispersion liquid includes a removal step of removing the single-walled carbon nanotube forming the bundle of which a length is 1.5 μm or less. Further, so as to obtain the conductive film that is higher in the transparency, the dispersion liquid is centrifugated (for example, it is centrifugated on a condition of 1000 G or more and 10000 G or less (yet, 3000 G or more and 5000 G or less)). And a supernatant is collected.

With the case that the single-walled carbon nanotube and the fullerene are contained in a separate layer, respectively, (see FIG. 2), this conductive film is produced by carrying out a simultaneous coating (double layered coating) or a sequential coating with each paint. Additionally, the above-mentioned technology philosophy is applied with respect to the single-walled carbon nanotube and the fullerene.

Various coating methods such as a spray coating method, a bar coating method, a roll coating method, an inkjet method, a screen coating method can be employed for the coating. And, after the coating step, a step of drying the solvent being contained in the coated film is performed. For example, a heating oven can be employed for the drying. Further, a far infrared oven can be employed. Further, an ultra-far infrared oven can be employed. Besides these ovens, the suitable apparatuses, which are used for drying, can be employed.

With the fullerenes being employed in the present invention, any fullerene is acceptable. For example, C60, C70, C76, C78, C82, C84, C90, C96, etc. can be listed. Needless to say, a mixture of these plural kinds of the fullerenes may be also employed. Additionally, C60 is particularly preferable from a viewpoint of the high-temperature durability of the conductive film. Yet, C60 is easy to obtain. In addition, the dispersion performance as well for the single-walled carbon nanotube is high. Additionally, not only C60 but also a mixture of C60 and the other kinds of the fullerenes (for example, C70) may be employed.

The fullerene having a metal atom appropriately contained inside it is also acceptable.

The fullerene having functional groups (polar groups) such as a hydroxyl group (OH group), a carboxyl group, an epoxy group, an ester group, an amide group, a sulfonyl group, and an ether group is preferable.

Further, the fullerene having phenyl-C61-propyl acid alkyl ester or phenyl-C61-butyric acid alkyl ester may be employed. A hydrogenation fullerene may be employed.

However, as mentioned above, the fullerene having an OH-group (hydroxyl group) is particularly preferable. The reason is that it is excellent in the high-temperature durability of the conductive film. Further, it is high in the dispersibility of the single-walled carbon nanotube. Additionally, a small quantity of the hydroxyl group leads to a decline in the above-mentioned special features. To the contrary, when the quantity of the hydroxyl group is much, the fullerene is hard to synthesize. Thus, it is preferable that the quantity of the hydroxyl groups is 5 to 30 pieces per one molecule of the fullerene. Particularly, the quantity of 8 to 15 pieces is preferable.

Herein, it seems that the reason why the fullerene raises the dispersibility of the single-walled carbon nanotube is as follows. A benzene ring being contained in the fullerene and a graphene sheet constituting the side wall of the carbon nanotube physically adhere to each other due to a π-π interaction. And, outwardly, the fullerene acts as a functional group of the single-walled carbon nanotube. It is thinkable that this has raised the dispersibility of the single-walled carbon nanotube. Additionally, in the foregoing, the reason why the explanation was made, saying "outwardly", is that the fullerene and the single-walled carbon nanotube are not chemically coupled to each other, but are physically coupled (they adhere to each other). The foregoing π-π interaction is larger as compared with the action by the surfactant conventionally proposed. That is, the fullerene strongly adheres to the single-walled carbon nanotube, thereby raising the dispersibility of the single-walled carbon nanotube.

By the way, it is understandable that the fullerene having a polar group is preferably employed when the solvent is a solvent having a polar group. The reason is that the fullerene having a polar group is more easily soluble in a polar solvent (for example, water or alcohol) than in a non-polar solvent. Thus, the fullerene having the polar group as described above is preferably employed from a viewpoint of the dispersibility of the single-walled carbon nanotube.

Well, when the single-walled carbon nanotube dispersion liquid is employed as a paint, water (or/and alcohol) is preferably employed as a solvent from a viewpoint of a reduction in the environmental burden and an improvement in the working environment. And, when such a solvent is employed, the fullerene having the functional groups (polar groups), for example, a hydroxyl group (OH-group), a carboxyl group, an epoxy group, an ester group, an amide group, a sulfonyl group, an ether group, or the like is preferably employed from a viewpoint of affinity between the solvent and the fullerene. Particularly, the fullerene having an OH-group (hydroxyl group) is preferable because water or alcohol has an OH-group.

It is preferable that a concentration of the fullerene is 1 ppm to 100000 ppm. Particularly, it is preferable that a concentration of the fullerene is 10 ppm to 10000 ppm. Among others, it is preferable that it is 100 ppm to 5000 ppm. The reason is that when the fullerene concentration is too high, a liquid viscosity become too high, which makes the coating difficult. To the contrary, when the fullerene concentration is too low, a large improvement in the dispersibility of the single-walled carbon nanotube is not yielded.

The carbon nanotube being employed in the present invention is the single-walled carbon nanotube. The reason is that the single-walled carbon nanotube is high in the conductivity as compared with a multi-walled carbon nanotube and the well-known carbon materials. The single-walled carbon nanotube subjected to the wet oxidation is preferable. The reason is that the dispersibility into the solvent is improved. No special limitation to the oxidation process is put so long as it is a wet oxidation process. However, inorganic acid such as hydrochloric acid, nitric acid, sulfuric acid, phosphoric acid, or a mixed acid thereof is preferably employed. Particularly, nitric acid having a concentration of 50% or more, or a mixed acid of nitric acid and sulfuric acid is preferably employed. With the case of employing a mixed acid of nitric acid and sulfuric acid, when a volume ratio of water, nitric acid, and sulfuric acid over an entirety of a mixed acid solution is defined as a (volume %), b (volume %), and c (volume %), respectively, the mixed acid satisfying $0.20 \leq \{a/(a+b+c)\} \leq 0.40$ and $0.20 \leq \{b/(b+c)\} \leq 0.30$ is more preferable. With regard to the reaction condition of the wet oxidation as well, there is no special limitation hereto. However, so as to perform an effective acid process, it is preferable that the reaction temperature is 85° C. or more. It is preferable that the reaction time is 24 hours or more and yet, it is 48 hours or more.

The single-walled carbon nanotube produced with any technique is employed in the present invention. The single-walled carbon nanotube is obtained, for example, with an arc discharge method, a laser ablation method, and a chemical vapor deposition method. However, the single-walled carbon nanotube obtained with the arc discharge method is preferable from a viewpoint of crystallization. And, the arc discharge method enables the single-walled carbon nanotube to be obtained at a high yield.

The single-walled carbon nanotube of which a purity is high is preferably employed in the present invention. The reason is that a low purity leads to a decline in a transparency. The well-known method can be employed so as to raise the purity. Specifically, the method can be listed of, after removing carbon particles by burning them with dry oxidation, immersing the single-walled carbon nanotube into an acid solution such as hydrochloric acid, and removing a metal catalyst. Further, the method can be listed of, after decomposing an amorphous carbon with wet oxidation, removing metal particles and carbon particles with the filtering. In the present invention, the purifying method employing the later is preferable. The reason is that the latter leads to an enhancement in the purity than the former.

The purity of the single-walled carbon nanotube can be confirmed with a Raman spectrum measurement. Specifically, with a ratio of an absorption intensity originating in the graphene sheet, being a main component constituting the carbon nanotube, and an absorption intensity originating in a carbon material other than it, the purity of the carbon nanotube can be confirmed. For example, with the case of irradiating the single-walled carbon nanotube produced with the arc-discharge with a laser beam of which a wavelength is 532 nm to measure it, it has a first absorption in a Raman scattering intensity in a range of which a Raman shift is 1340±40 cm$^{-1}$. Further, it has a second absorption in a Raman scattering intensity in a range of which a Raman shift is 1590±20 cm$^{-1}$. Herein, the first absorption is an absorption originating in sp$^3$ orbital of the carbon atom. It is said that the second absorption is an absorption originating in the graphene sheet. And, the purity of the carbon nanotube of which the second absorption intensity is larger as compared with its first absorption intensity is high.

And, the single-walled carbon nanotube in accordance with the present invention satisfying the following condition is preferable. That is, the single-walled carbon nanotube has a first absorption in a Raman scattering intensity in a range of which a Raman shift is 1340±40 cm$^{-1}$ in terms of a Raman spectrum that is detected with irradiation of a laser beam of which a wavelength is 532 nm. Yet, it has a second absorption in a Raman scattering intensity in a range of which a Raman shift is 1590±20 cm$^{-1}$. The single-walled carbon nanotube, which satisfies Equation (1) when the foregoing first absorption intensity and the foregoing second absorption intensity are defined as ID and IG, respectively, is preferable. The single-walled carbon nanotube satisfying Equation (2) is particularly preferable. That is, when a value of ID/IG was 0.03 or less, the single-walled carbon nanotube was high in the purity, and was excellent in both of the transparency/conductivity.

$$0 < ID/IG \leq 0.03 \quad \text{Equation (1)}$$

$$0 < ID/IG \leq 0.02 \quad \text{Equation (2)}$$

The single-walled carbon nanotube preferably forms a bundle in the dispersion liquid (in addition, in the conductive film). In the present invention, the so-called bundle signifies a situation (shape) in which plural pieces of the single-walled carbon nanotubes are overlapped upon each other due to van der Waals force of side wall partners. Additionally, the single-walled carbon nanotube prepared with the known method is obtained in a situation of being bundled, and the lengths of this bundle have a certain distribution. However, the single-walled carbon nanotube having the following characteristics is particularly preferable. That is, with the single-walled carbon nanotube, the lengths of the bundle thereof have a certain distribution, and this distribution is characteristic. For example, the number of the bundles of which the length exceeds 1.5 µm is more than that of the bundles of which the length is 1.5 µm or less. Preferably, the number of the bundles of which the length is 2.0 µm or more is more than that of the bundles of which the length is 1.5 µm or less. Yet preferably, the number of the bundles of which the length is 2.5 µm or more is more than that of the bundles of which the length is 1.5 µm or less. Or, a mode in a frequency distribution (a frequency distribution table or a frequency distribution diagram) of the bundle length for each 0.5 µm exceeds 1.5 µm. Preferably, a mode in a frequency distribution of the length of the bundle exceeds 2.0 µm. Yet preferably, a mode in a frequency distribution of the length of the bundle exceeds 2.5 µm. And, when the bundle had a distribution having the above-mentioned characteristic, the single-walled carbon nanotube was excellent in both of the transparency/conductivity.

With the solvent for constituting the paint, a solvent being employed for the general-use paint is acceptable. However, the solvent of which a boiling point is 200° C. or less is preferable (the preferable lower limit value is 25° C., and yet, it is 30° C.). The reason why the solvent having a low boiling point is preferable is that drying after the coating is made easy. Specifically, alcohol compounds (particularly, alcohol of which a carbon number is 7 or less, and particularly, aliphatic alcohol) such as water, methanol, ethanol, normal-propanol, and isopropanol, or a mixture thereof are preferable. The solvent indicative of alkaline in which pH exceeds 7 is preferable when water is employed. The reason is that the fullerene containing a hydroxyl group is highly soluble. For this, the single-walled carbon nanotube dispersion liquid having a higher concentration can be obtained. Besides, for example, ketone compounds such as acetone, methyl ethyl ketone, methyl isobutyl ketone, and cyclohexanone can be employed. Further, ester compounds such as methyl acetate, ethyl acetate, butyl acetate, ethyl lactate, and methoxyethyl acetate can be employed. Further, ether compounds such as diethyl ether, ethylene glycol dimethyl ether, ethyl cellosolve, butyl cellosolve, phenyl cellosolve, and dioxane can be employed. Further, aromatic compounds such as toluene and xylene can be employed. Further, aliphatic compounds such as pentane and hexane can be employed. Further, halogenic hydrocarbons such as dichloromethane, chlorobenzene, and chloroform can be employed. A mixture of the foregoing compounds can be employed.

No special limit to the substrate member being coated with the single-walled carbon nanotube dispersion liquid is put. The transparent substrate member (film, sheet, plate of which a thickness is higher than the foregoing film (sheet)) is preferable in a field in which the transparency is required, for example, a transparent electrode being employed for a display etc. For example, acrylic resin, polyester resin, polycarbonate resin, polystyrene resin, styrene-acrylic acid copolymer, vinyl chloride resin, polyolefin, ABS (acrylonitrile-butadiene-styrene copolymer), vinyl alcohol resin, cycloolefin resin, cellulose resin, etc. can be employed. Besides, inorganic glass etc. can be employed. However, the substrate member made of organic resin that is excellent in flexibility is preferable. A hard coat layer, an anti-contamination layer, an anti-glare layer, an anti-reflection layer, an adhesive layer, a colored layer etc. are formed (laminated) on the surface of the foregoing substrate member (the surface of the side in which the conductive layer is formed, and/or on the backside opposite to the side in which the conductive layer is formed) responding to a necessity. The thickness of the substrate member is governed by the purpose thereof. However, as a rule, it is 10 µm to 10 mm or so. Additionally, so as to prevent the transparent conductive film from being damaged, a protective layer can be formed upon the transparent conductive film. However, the transparent conductive film in accordance with the present invention does not require the protective layer because it is excellent in abrasion-resistance. That is, existence of the fullerene in or on the film of the single-walled carbon nanotube makes magnitude of roughness between the single-walled carbon nanotubes small. For this, even though no protective layer is formed, flatness is enhanced. It seems the abrasion-resistance thereof has been improved as a result. Further, the layer configuration that is comprised of the hard coat layer, the transparent conductive film containing the single-walled carbon nanotube and the fullerene, and the protective layer may be formed upon the substrate member.

The transparent conductive film in accordance with the present invention necessitates the transparency and the conductivity because it is employed for a transparent electrode. Specifically, it is preferable that the total light transmission is 80% or more and yet the surface resistivity is 5000Ω/□ or less. Yet, it is preferable that the total light transmittance is 80% or more and yet the surface resistivity is 3000Ω/□ or less. Particularly, it is preferable that the total light transmittance is 80% or more and yet the surface resistivity is 1000Ω/□ or less. Among them, it is preferable that the all-light transmittance is 80% or more and yet the surface resistivity is 200Ω/□ or less. Additionally, what is called herein the total light transmittance is indicative of an total light transmittance relating to not only the conductive film containing the single-walled carbon nanotube but also the substrate member.

Further, preferably, an increase ratio [(R1−R0)/R0×100] of a surface resistivity is 30 or less when a surface resistivity after having kept the transparent conductive film at 80° C. for 14 days is defined as R1 (Ω/□), and a surface resistivity before keeping the transparent conductive film at 80° C. for 14 days as R0 (Ω/□). Yet preferably, an increase ratio [(R1−R0)/R0×100] is 20 or less. Needless to say, 0 is most preferable.

And, the transparent conductive film, which is characteristic of the foregoing, can be utilized for an electrode substrate for a touch panel. Further, it can be utilized for an electrode substrate for electronic paper. Further, it can be utilized for an electrode substrate for a liquid crystal display. Further, it can be utilized for an electrode substrate for plasma display. Besides, it can be utilized for various applications.

Hereinafter, the present invention will be explained by listing specific examples. Additionally, needless to say, the present invention is not limited to the following examples.

Example 1

Step 1

The single-walled carbon nanotube was prepared with the arc-discharge method. This prepared single-walled carbon nanotube was subjected to the reaction (wet oxidation) with nitric acid having a concentration of 63% at 85° C. for 2 days. Thereafter, the single-walled carbon nanotube was purified/collected with the filtering.

Additionally, the length of the bundles of this purified single-walled carbon nanotube was investigated. As a result, a mode in the frequency distribution for each 0.5 µm existed in the range of 1.5 µm to 2.0 µm. And, a ratio of the number of the bundles of the single-walled carbon nanotube of which the length of the bundle exceeded 1.5 µm over an entirety was 73%. A ratio of the number of the bundles of the single-walled carbon nanotube of which the length of the bundle was 1.5 µm or less over an entirety was 27%. Further, a result of having made a Raman measurement of the obtained single-walled carbon nanotube demonstrated that ID/IG was 0.013 (532 nm wavelength and a name of the apparatus: HoloLab 5000 manufactured by Shimadzu Corporation).

And, 10 mg of the single-walled carbon nanotube obtained in the above-mentioned manner, 10 mg of the fullerene containing a hydroxyl group (a product name: Nanom Spectra D-100 produced by Frontier Carbon Corporation; the fullerene is consisted of only C60), 1 mg of sodium hydroxide (produced by Wako Pure Chemical Industries, Ltd.), 5 ml of water, and 5 ml of methanol were mixed.

Step 2

The mixed liquid obtained in the above-mentioned step 1 was irradiated with the ultrasonic waves. That is, the mixed liquid was irradiated with the ultrasonic waves for one minute by employing a sonicator (ULTRASONIC HOMOGENIZER MODEL UH-600SR manufactured by SMT Co., Ltd.) and was subjected to an ultrasonic dispersion. With this, the single-walled carbon nanotube dispersion liquid was obtained.

Step 3

The polycarbonate substrate with the hard coat was coated with the single-walled carbon nanotube dispersion liquid obtained in the above-mentioned step 2 by employing the bar coating method. The thickness thereof is 50 µm with a wet thickness. Thereafter, it was dried at 80° C. for 3 minutes, and the polycarbonate substrate with the transparent conductive film of a FIG. 1 type was obtained.

Example 2

The operation was performed similarly to the case of the example 1 except that the quantity of the fullerene containing the hydroxyl group and sodium hydroxide employed in the example 1 was 1 mg and 0.1 mg, respectively, and the polycarbonate substrate with the transparent conductive film was obtained.

Example 3

The operation was performed similarly to the case of the example 1 except that the quantity of the fullerene containing the hydroxyl group and sodium hydroxide employed in the example 1 was 100 mg and 10 mg, respectively, and the polycarbonate substrate with the transparent conductive film was obtained.

Example 4

Step 1

After 10 mg of the single-walled carbon nanotube obtained in the example 1, 20 mg of sodium hydroxide, 10 mg of octylphenol polyethylene glycol ether (produced by TOKYO CHEMICAL INDUSTRY CO., LTD.), and 10 g of water were mixed, these were irradiated with the ultrasonic waves for one minute (an apparatus name: ULTRASONIC HOMOGENIZER MODEL UH-600SR manufactured by SMT Co., Ltd.). With this, the single-walled carbon nanotube dispersion liquid was obtained.

And, the polycarbonate substrate with the hard coat was coated with this single-walled carbon nanotube dispersion liquid by employing the spray coating method. The thickness thereof is 50 µm with a wet thickness. Thereafter, after the surface was cleaned with methanol, it was dried at 80° C. for 3 minutes, thereby to constitute the transparent conductive film.

Step 2

Next, after 10 mg of the fullerene containing a hydroxyl group (a product name: Nanom Spectra D-100 produced by Frontier Carbon Corporation), 1 mg of sodium hydroxide (produced by Wako Pure Chemical Industries, Ltd.), and 10 g of water were mixed, these were irradiated with the ultrasonic waves for one minute (an apparatus name: ULTRASONIC HOMOGENIZER MODEL UH-600SR manufactured by SMT Co., Ltd.). With this, the fullerene solution was obtained.

And, the above-mentioned transparent conductive film was spray-coated with this fullerene solution so that the wet thickness of the fullerene solution was 50 μm. Thereafter, after the surface was cleaned with methanol, it was dried at 80° C. for 3 minutes, thereby to constitute the transparent conductive film, and the polycarbonate substrate with the transparent conductive film of a FIG. 2 type was obtained.

Comparative Example 1

After 10 mg of the single-walled carbon nanotube obtained in the example 1, 20 mg of sodium hydroxide, 10 mg of octylphenol polyethylene glycol ether (produced by TOKYO CHEMICAL INDUSTRY CO., LTD.), and 10 g of water were mixed, these were irradiated with the ultrasonic waves for one minute (an apparatus name: ULTRASONIC HOMOGENIZER MODEL UH-600SR manufactured by SMT Co., Ltd.). With this, the single-walled carbon nanotube dispersion liquid was obtained.

The polycarbonate substrate with the hard coat was spray-coated with this single-walled carbon nanotube dispersion liquid so that the wet thickness was 50 μm. Thereafter, after the surface was cleaned with methanol, it was dried at 80° C. for 3 minutes, thereby to form the transparent conductive film.

Comparative Example 2

In the comparative example 2, the operation was performed similarly to the case of the comparative example 1 except that the transparent conductive film obtained in the comparative example 1 was furthermore spray-coated with polyester resin (a product name: VYLON 660 produced by TOYOBO) so that the wet thickness is 50 μm.

The total light transmittance of the polycarbonate substrate with the transparent conductive film obtained in each of the above-mentioned examples was measured (an apparatus name: Direct-Reading Haze Computer manufactured by Suga Test Instruments Co., Ltd.). Further, the surface resistivity thereof ($R_0$) was measured (an apparatus name: Loresta-EP manufactured by Dias Instruments Co., Ltd.). Its result is shown in Table 1.

Further, after preserving the polycarbonate substrate with the transparent conductive film at 80° C. for 14 days, the surface resistivity thereof ($R_1$) was measured. Its result as well is shown in Table 1.

Figure 2:
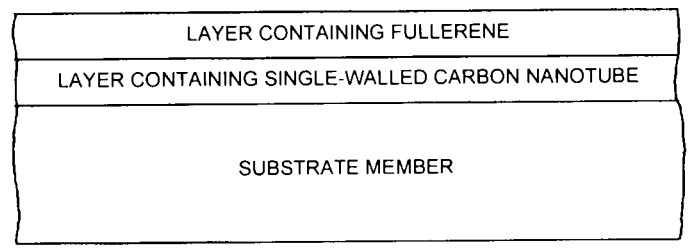
FIG. 2 is a schematic view of the transparent conductive film of the present invention.

In addition, 12 pieces of cheesecloth were overlapped upon each other, and were attached to a tip of a metal bar of which a diameter is 0.6 mm. The transparent conductive film, to which a load of 500 g was applied, was caused to contact this, and a surface of a transferring layer was caused to go and go back ten times in this situation. Thereafter, the surface resistivity thereof was measured. This result (the surface resistivity after an abrasion test) is shown in FIG. 1.

TABLE 1

| | Total light Transmittance (%) | surface resistivity values surface resistivity $\Omega/\square$ | | | |
|---|---|---|---|---|---|
| | | Before High-temperature test ($R_0$) | After High-temperature test ($R_1$) | Increase ratio $\frac{R_1-R_0}{R_0} \times 100$ | After abrasion test |
| Example 1 | 89.8 | 2120 | 2250 | 6.13% | 2130 |
| Example 2 | 90.3 | 2530 | 2900 | 14.6% | 2610 |
| Example 3 | 83.0 | 850 | 840 | — | 800 |
| Example 4 | 80.8 | 750 | 820 | 9.33% | 780 |
| Comparative example 1 | 81.3 | 710 | 3760 | 429% | X |
| Comparative example 2 | 81.3 | 720 | 2300 | 219% | 740 |

X is indicative of not less than a measurement limit value.

It can be seen from this that the transparent conductive film of the present invention is excellent in the transparency. Yet, it is excellent in the conductivity, and particularly, it can be seen that the transparent conductive film is low in the deterioration at the time of its high temperature, and is excellent in the durability. In addition, the transparent conductive film of the present invention can be used without the protective layer because it is high in the abrasion-resistance.

How the Invention is Capable of Industrial Exploitation

The present invention can be advantageously utilized, for example, for a transparent electrode, a touch panel member, and an electromagnetic wave shield material.

The invention claimed is:

1. A transparent conductive film, comprising:
   a single-walled carbon nanotube; and
   a fullerene directly bonded to an OH group,
   wherein, when a surface resistivity after having kept the transparent conductive film at 80° C. for 14 days is defined as R1 ($\Omega/\square$), and a surface resistivity before keeping the transparent conductive film at 80° C. for 14 days as R0 ($\Omega/\square$), an increase ratio [(R1−R0)/R0×100] of a surface resistivity is 30 or less,
   wherein the total light transmittance of the transparent conductive film is 80% or more and the surface resistivity of the transparent conductive film is 3000$\Omega/\square$ or less.

2. The transparent conductive film as claimed in claim 1, comprising the single-walled carbon nanotube and the fullerene in an identical layer.

3. The transparent conductive film as claimed in claim 1, wherein a layer comprising the single-walled carbon nanotube and a layer comprising the fullerene are different.

4. The transparent conductive film as claimed in claim 3, wherein the layer comprising the fullerene is present on the layer comprising the single-walled carbon nanotube.

5. The transparent conductive film as claimed in claim 1, having a content of 10 to 1000 mass parts of the fullerene per 100 mass parts of the single-walled carbon nanotube.

6. The transparent conductive film as claimed in claim 1, wherein the fullerene has a polar group.

7. The transparent conductive film as claimed in claim 1, wherein the quantity of the hydroxyl groups is 5 to 30 groups per one molecule of the fullerene.

8. The transparent conductive film as claimed in claim 1, wherein the quantity of the hydroxyl groups is 8 to 15 groups per one molecule of the fullerene.

9. The transparent conductive film as claimed in claim 1, having a content of 20 to 100 mass parts of the fullerene per 100 mass parts of the single-walled carbon nanotube.

10. The transparent conductive film as claimed in claim 1, wherein the fullerene is C60.

11. The transparent conductive film as claimed in claim 1, which has a surface resistivity of 200Ω/☐ or less.

12. A method of making the transparent conductive film as claimed in claim 1, comprising preparing a transparent conductive film comprising the single-walled carbon nanotube and the fullerene directly bonded to an OH group.

* * * * *